United States Patent
Mayfield

(10) Patent No.: US 12,342,103 B2
(45) Date of Patent: Jun. 24, 2025

(54) RECORDING VIRTUAL WHITEBOARDS DURING VIRTUAL MEETINGS

(71) Applicant: Zoom Video Communications, Inc., San Jose, CA (US)

(72) Inventor: Ross Douglas Mayfield, Palo Alto, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/877,107

(22) Filed: Jul. 29, 2022

(65) Prior Publication Data

US 2024/0040084 A1 Feb. 1, 2024

(51) Int. Cl.
*G06F 3/0481* (2022.01)
*G06F 3/0484* (2022.01)
*G06F 3/0488* (2022.01)
*G06F 3/14* (2006.01)
*H04N 7/15* (2006.01)

(52) U.S. Cl.
CPC ........... *H04N 7/155* (2013.01); *G06F 3/1454* (2013.01)

(58) Field of Classification Search
CPC ............................. H04N 7/155; G06F 3/1454
See application file for complete search history.

(56) References Cited

U.S. PATENT DOCUMENTS

| | | | |
|---|---|---|---|
| 6,008,804 A * | 12/1999 | Pommier | H04L 9/40 709/204 |
| 11,042,575 B2 * | 6/2021 | Fox | G06F 16/176 |
| 11,374,990 B2 * | 6/2022 | Lansing | H04L 65/403 |
| 12,154,305 B2 * | 11/2024 | Nomura | G06V 10/25 |
| 2013/0297680 A1 * | 11/2013 | Smith | H04L 67/535 709/217 |
| 2016/0226935 A1 * | 8/2016 | Coppinger | G06Q 10/10 |
| 2020/0387567 A1 * | 12/2020 | Loforte | G06F 16/93 |
| 2021/0004136 A1 * | 1/2021 | Takanashi | G06F 3/04845 |
| 2021/0397402 A1 * | 12/2021 | Ashkenazi | H04L 63/105 |
| 2022/0086200 A1 * | 3/2022 | Lansing | H04L 65/611 |
| 2022/0326835 A1 * | 10/2022 | Takanashi | H04N 21/440236 |
| 2024/0078007 A1 * | 3/2024 | Nomura | G06V 20/62 |

* cited by examiner

*Primary Examiner* — Jordany Nunez
(74) *Attorney, Agent, or Firm* — Kilpatrick Townsend & Stockton LLP

(57) ABSTRACT

One example method includes establishing a virtual meeting and joining a plurality of client devices to the virtual meeting, each client device associated with a corresponding participant; in response to a request to record the virtual meeting, recording the virtual meeting; accessing a virtual whiteboard based on a request received from a first participant; receiving inputs associated with the virtual whiteboard from the first participant; and storing whiteboard information associated with the inputs as a part of recording the virtual meeting.

20 Claims, 14 Drawing Sheets

RECORDING VIRTUAL WHITEBOARDS DURING VIRTUAL MEETINGS

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
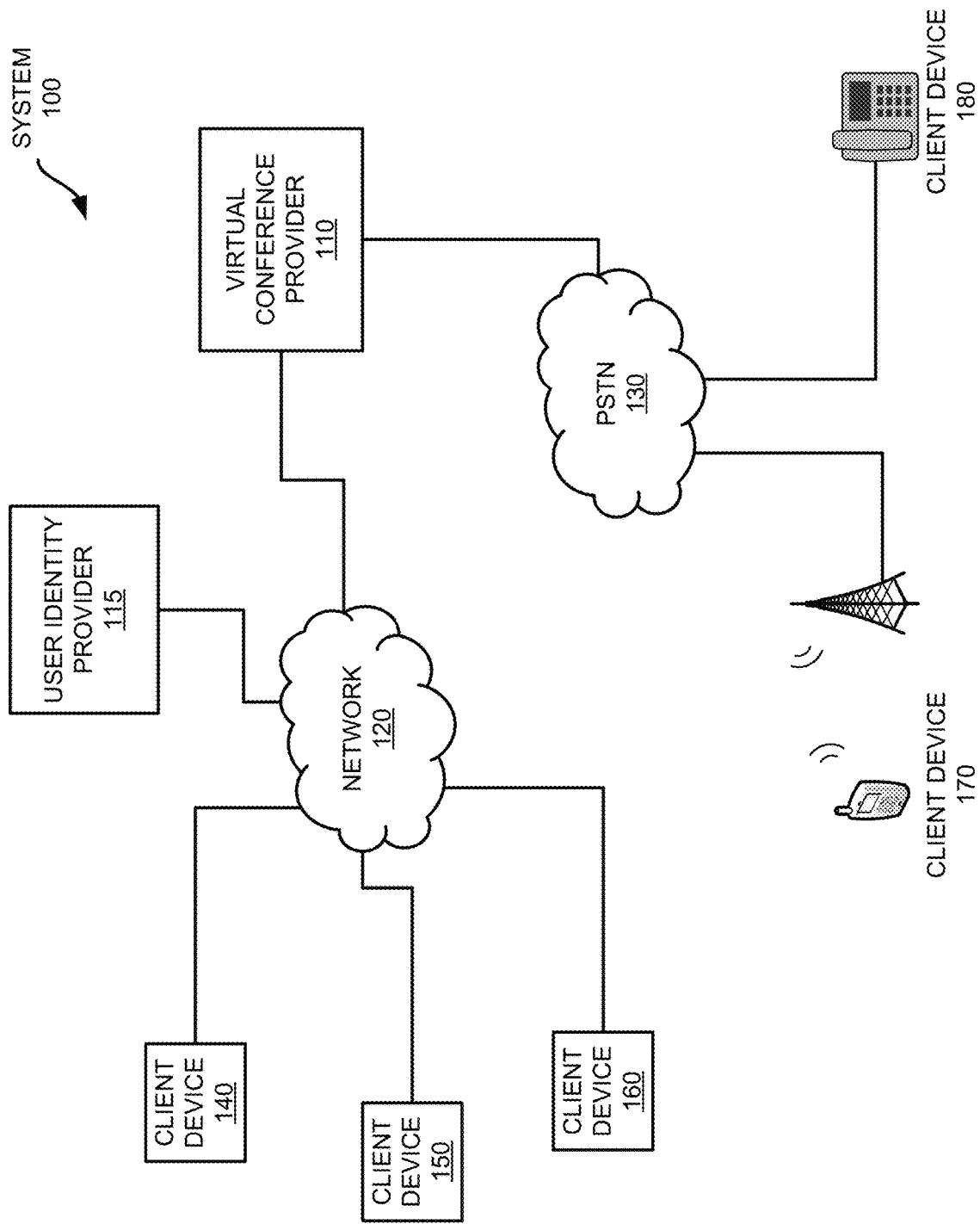
FIGS. 1-2 show example systems for sharing virtual whiteboard content.

Examples are described herein in the context of recording virtual whiteboards during virtual meetings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Virtual conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters.

During virtual meetings, participants may present content to the other participants for discussion. Presented content may be presentations, documents, videos, or any other type of content viewable on a computer display. One type of content that is becoming more prevalent is the use of a virtual whiteboard (or "whiteboard"), which presents an open canvas for users to add drawings, pictures, text, and other digital content. Unlike traditional document-based programs, whiteboards can have (theoretically) unbounded size. So if a user needs additional room to add material to the whiteboard, they can simply move to a new region of the whiteboard and add the material.

Virtual whiteboards can be useful collaboration tools and groups of collaborators may wish to interact with a virtual whiteboard during a virtual meeting. This may allow the users to view a common portion of the whiteboard while allowing the host of the meeting, or another participant, the ability to control interactions with the whiteboard, such as to add, modify, or remove content. However, while the whiteboard retains its state after the virtual meeting concludes, including any changes made during the virtual meeting, participants or other collaborators who were unable to attend the meeting may wish to review a recording of the virtual meeting, such as the discussions had during the meeting, but also view the whiteboard concurrently with the recorded discussion and see how the whiteboard was accessed or modified during the meeting.

To enable such functionality, a participant in a virtual meeting may access a virtual whiteboard and present it during the meeting as the meeting is being recorded. The virtual conference provider may then receive user inputs associated with the virtual whiteboard that adjusts a view into the whiteboard or that adds, modifies, or removes content. The virtual conference provider may record the graphical representation of the virtual whiteboard that is presented to the users during the meeting, but may also include whiteboard information to allow a viewer of the recording to access the whiteboard through the recording and view the whiteboard itself as changes are made or maneuver within the whiteboard to review other parts of the whiteboard as they existed at the time of the recording. Thus, the recording may include both a visual representation of the whiteboard as visible within the virtual meeting, but also provide the ability to interact with the whiteboard as it existed at the time of the meeting. Thus, viewers of the recording may be able to view a much richer recording of the virtual meeting than is otherwise available through just a recording the graphical representation of the whiteboard visible within the meeting.

This illustrative example is given to introduce the reader to the general subject matter discussed herein and the disclosure is not limited to this example. The following sections describe various additional non-limiting examples and examples of recording virtual whiteboards during virtual meetings.

Referring now to FIG. 1, FIG. 1 shows an example system 100 that provides videoconferencing functionality to various client devices. The system 100 includes a virtual conference provider 110 that is connected to multiple communication networks 120, 130, through which various client devices 140-180 can participate in virtual conferences hosted by the virtual conference provider 110. For example, the virtual conference provider 110 can be located within a private network to provide video conferencing services to devices within the private network, or it can be connected to a public network, e.g., the internet, so it may be accessed by anyone. Some examples may even provide a hybrid model in which a virtual conference provider 110 may supply components to enable a private organization to host private internal virtual conferences or to connect its system to the virtual conference provider 110 over a public network.

The system optionally also includes one or more user identity providers, e.g., user identity provider 115, which can provide user identity services to users of the client devices 140-160 and may authenticate user identities of one or more users to the virtual conference provider 110. In this example, the user identity provider 115 is operated by a different entity than the virtual conference provider 110, though in some examples, they may be the same entity.

Figure 2:
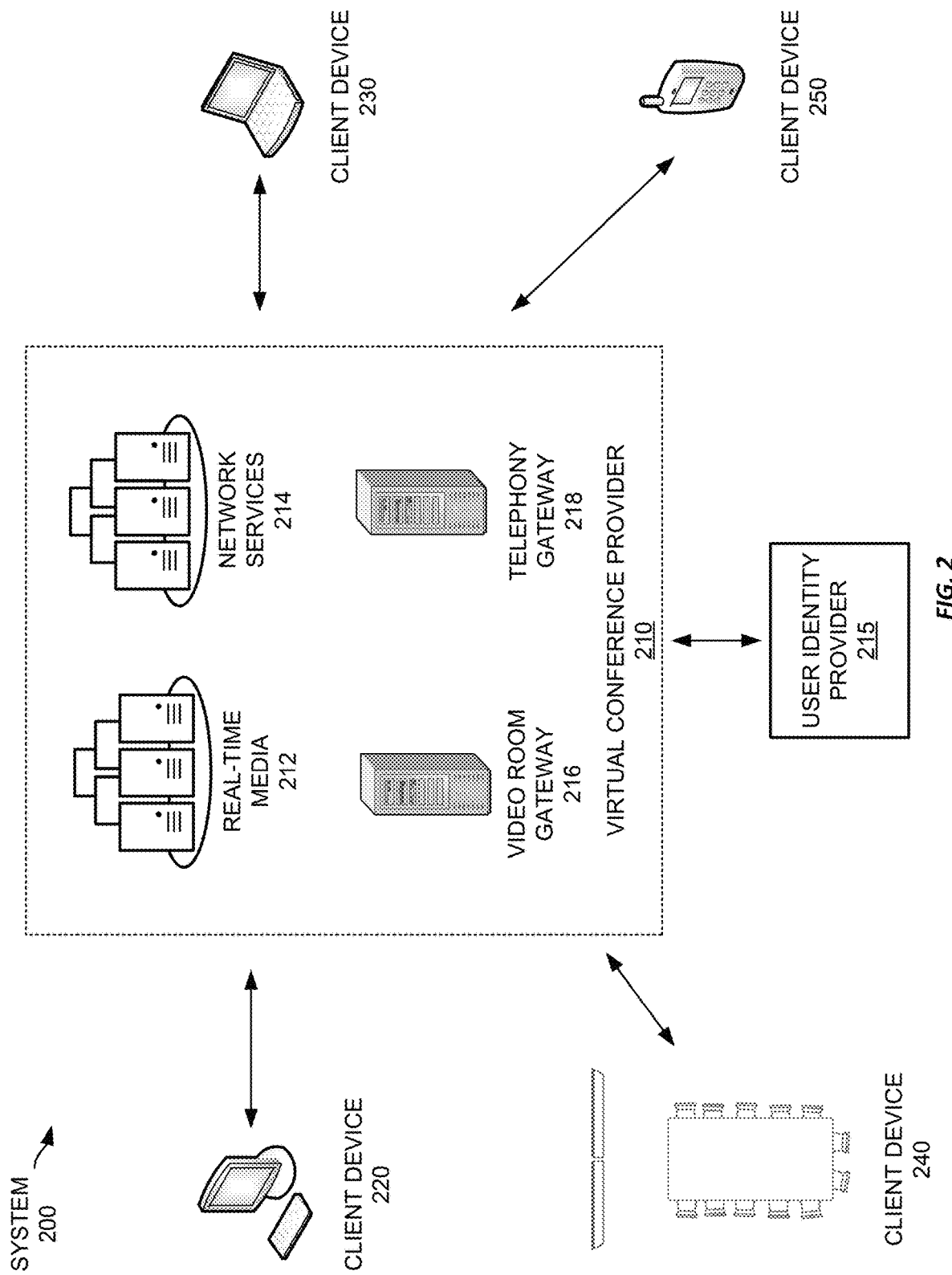

Virtual conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the virtual conference provider 110.

Meetings in this example virtual conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the virtual conference provider 110, a user may contact the virtual conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the virtual conference provider 110 may prompt the user for certain information, such as a date, time, and duration for the meeting, a number of participants, a type of encryption to use, whether the meeting is confidential or open to the public, etc. After receiving the various meeting settings, the virtual conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The virtual conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the virtual conference provider 110. They also receive audio or video information from the virtual conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The virtual conference provider 110 may also invalidate the meeting information, such as the meeting identifier or password/passcode.

To provide such functionality, one or more client devices 140-180 may communicate with the virtual conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the virtual conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a virtual conference meeting hosted by the virtual conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the virtual conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the virtual conference provider 110 using network 120 and may provide information to the virtual conference provider 110 to access functionality provided by the virtual conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the virtual conference provider 110.

A user identity provider 115 may be any entity trusted by the virtual conference provider 110 that can help identify a user to the virtual conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the virtual conference provider 110.

When the user accesses the virtual conference provider 110 using a client device, the virtual conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the virtual conference provider 110 either provides or denies access to its services, respectively.

For telephony devices, e.g., client devices 170-180, the user may place a telephone call to the virtual conference provider 110 to access virtual conference services. After the call is answered, the user may provide information regarding a virtual conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the virtual conference provider 110. For example, telephony devices may be unable to provide user identification information to identify the telephony device or the user to the virtual conference provider 110. Thus, the virtual conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the virtual conference provider 110, even in cases where the user has an authenticated identity and employs a client device capable of identifying the user to the virtual conference provider 110. The virtual conference provider 110 may determine whether to allow such anonymous users to use services provided by the virtual conference provider 110. Anonymous users, regardless of the reason for anonymity, may be restricted as discussed above with respect to users employing telephony devices, and in some cases may be prevented from accessing certain meetings or other services, or may be entirely prevented from accessing the virtual conference provider 110.

Referring again to virtual conference provider 110, in some examples, it may allow client devices 140-160 to encrypt their respective video and audio streams to help improve privacy in their meetings. Encryption may be provided between the client devices 140-160 and the virtual conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the virtual conference provider 110, while allowing the virtual conference provider 110 to access the decrypted multimedia streams to perform certain processing, such as recording the meeting for the participants or generating transcripts of the meeting for the participants. End-to-end encryption may be used to keep the meeting entirely private to the participants without any worry about a virtual conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the virtual conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a virtual conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the virtual conference provider 210 over a communications network, such as the internet for client devices 220-240 or the PSTN for client device 250, generally as described above with respect to FIG. 1. The virtual conference provider 210 is also in communication with one or more user identity providers 215, which can authenticate various users to the virtual conference provider 210 generally as described above with respect to FIG. 1.

In this example, the virtual conference provider 210 employs multiple different servers (or groups of servers) to provide different aspects of virtual conference functionality, thereby enabling the various client devices to create and participate in virtual conference meetings. The virtual conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more virtual conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the virtual conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the virtual conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the virtual conference provider 210 may receive multimedia streams from the various participants and publish those streams to the various participants to subscribe to and receive. Thus, the virtual conference provider 210 notifies a client device, e.g., client device 220, about various multimedia streams available from the other client devices 230-250, and the client device 220 can select which multimedia stream(s) to subscribe to and receive. In some examples, the virtual conference provider 210 may provide to each client device the available streams from the other client devices, but from the respective client device itself, though in other examples it may provide all available streams to all available client devices. Using such a multiplexing technique, the virtual conference provider 210 may enable multiple different streams of varying quality, thereby allowing client devices to change streams in real-time as needed, e.g., based on network bandwidth, latency, etc.

As mentioned above with respect to FIG. 1, the virtual conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the virtual conference provider 210 may allow a meeting participant to notify it of inappropriate behavior or content in a meeting. Such a notification may trigger the real-time media servers to 212 record a portion of the meeting for review by the virtual conference provider 210. Still other functionality may be implemented to take actions based on the decrypted multimedia streams at the virtual conference provider 210, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the virtual conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the virtual conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the virtual conference provider 210 under a supervisory set of servers. When a client device 220-250 accesses the virtual conference provider 210, it will typically communicate with one or more network services servers 214 to access their account or to participate in a meeting.

When a client device 220-250 first contacts the virtual conference provider 210 in this example, it is routed to a network services server 214. The client device may then provide access credentials for a user, e.g., a username and password or single sign-on credentials, to gain authenticated access to the virtual conference provider 210. This process may involve the network services servers 214 contacting a user identity provider 215 to verify the provided credentials. Once the user's credentials have been accepted, the client device 214 may perform administrative functionality, like updating user account information, if the user has an identity with the virtual conference provider 210, or scheduling a new meeting, by interacting with the network services servers 214.

In some examples, users may access the virtual conference provider 210 anonymously. When communicating anonymously, a client device 220-250 may communicate with one or more network services servers 214 but only provide information to create or join a meeting, depending on what features the virtual conference provider 210 allows for anonymous users. For example, an anonymous user may access the virtual conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the virtual conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the virtual conference provider 210. For example, the video conferencing hardware may be provided by the virtual conference provider 210 to one or more of its subscribers, which may provide access credentials to the video conferencing hardware to use to connect to the virtual conference provider 210.

The video room gateway servers 216 provide specialized authentication and communication with the dedicated video conferencing hardware that may not be available to other client devices 220-230, 250. For example, the video conferencing hardware may register with the virtual conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the virtual conference provider 210.

Referring now to the telephony gateway servers 218, these servers 218 enable and facilitate telephony devices' participation in meetings hosed by the virtual conference provider 210. Because telephony devices communicate using the PSTN and not using computer networking protocols, such as TCP/IP, the telephony gateway servers 218 act as an interface that converts between the PSTN and the networking system used by the virtual conference provider 210.

For example, if a user uses a telephony device to connect to a meeting, they may dial a phone number corresponding to one of the virtual conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the virtual conference provider 210 discussed above are merely examples of such devices and an example architecture. Some virtual conference providers may provide more or less functionality than described above and may not separate functionality into different types of servers as discussed above. Instead, any suitable servers and network architectures may be used according to different examples.

Figure 3A:
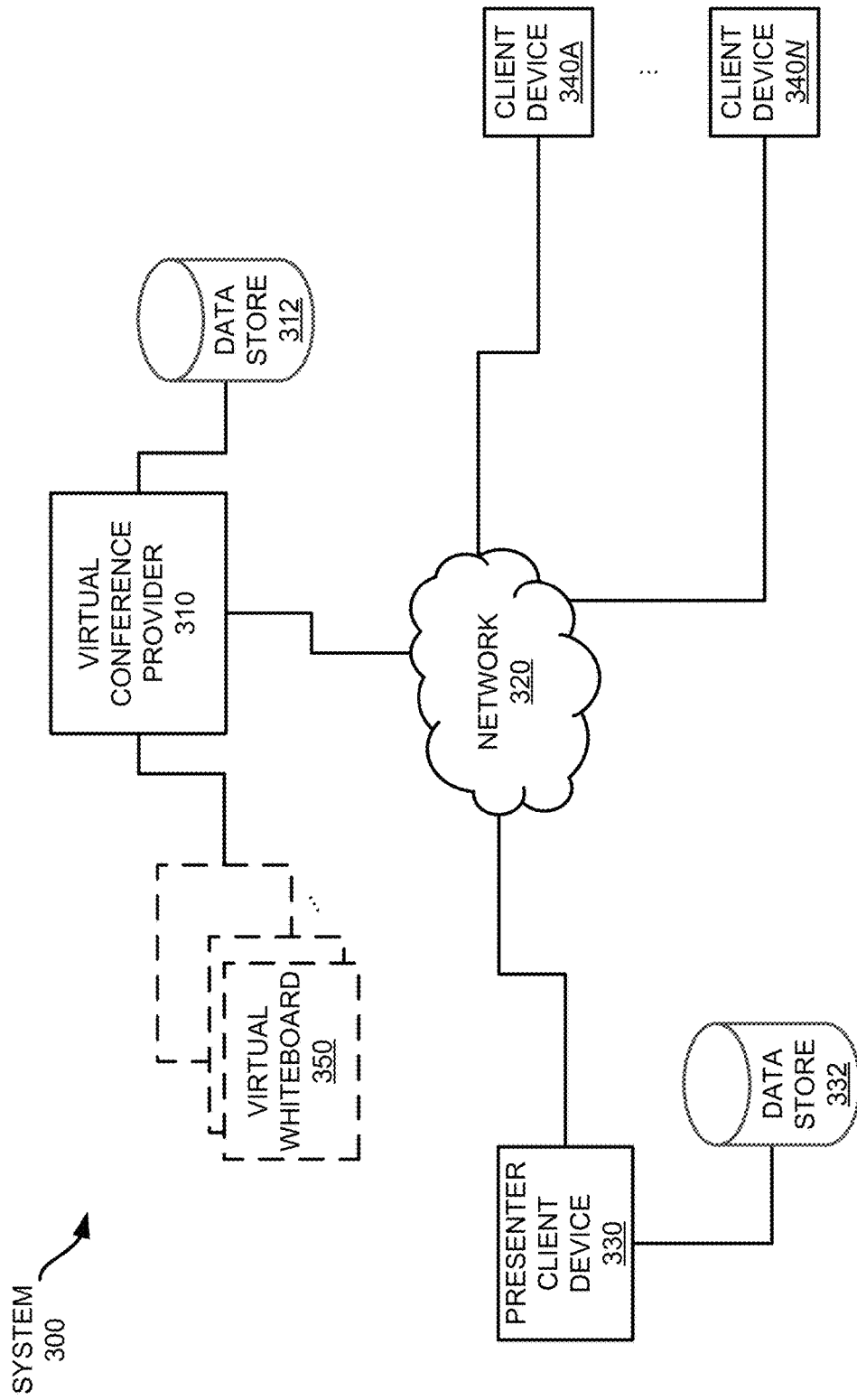
FIGS. 3A-3B show an example system for recording virtual whiteboards during virtual meetings.

Referring now to FIG. 3A, FIG. 3A shows an example system 300 for recording virtual whiteboards during virtual meetings. The system 300 shown in FIG. 3A includes a virtual conference provider 310 that has established and maintains multiple virtual whiteboards 350. The system 300 also includes multiple client devices 330, 340*a-n* that are connected to the virtual conference provider 310 via a network 320. In this example, the network 320 is the internet; however, any communications network or combination of communications networks may be employed. And while the system 300 is depicted as including multiple client devices 330, 340*a-n*, it should be appreciated that some example systems may not include any client devices at any particular time.

The virtual conference provider 310 establishes new whiteboards 350 at the request of corresponding users and stores one or more records in a data store 312 to represent the configuration and state of each whiteboard 350. For example, when a whiteboard is first established, it may not have any content within it, though some examples may allow users to use a template to create a new whiteboard with certain initial content. However, as content is added to the whiteboard 350, the virtual conference provider 310 stores the updated state of the whiteboard in its data store 312. Further, in some examples, the content may not be stored within the data store 312 or even stored by the virtual conference provider 310. Instead, the whiteboard may reference external content, such as by using a universal resource locator ("URL"), by referencing a document within a document management system or stored in a local networked storage area. However, it should be appreciated that some examples may store content as records within the database along with the configuration and state of the whiteboard itself.

Each of the whiteboards 350 established and maintained by the virtual conference provider 310 allows users to connect to the whiteboard, interact with the content displayed within the whiteboard, and modify the whiteboard, assuming the user has sufficient access privileges. However, each of the whiteboards 350 persists independently of whether any users are connected to the whiteboard. Thus, the whiteboard remains latent and available for use at any time.

To access a virtual whiteboard 350, a user, such as the user of presenter client device 330, accesses the virtual conference provider 310, such as by providing access credentials, and an identifier for the whiteboard, such as by entering a URL or by selecting a whiteboard from available whiteboards within a GUI. The user may then interact with the whiteboard 350, such as by navigating to different portions of the whiteboard, adding new content to the whiteboard, or modifying or deleting existing content.

Figure 3B:
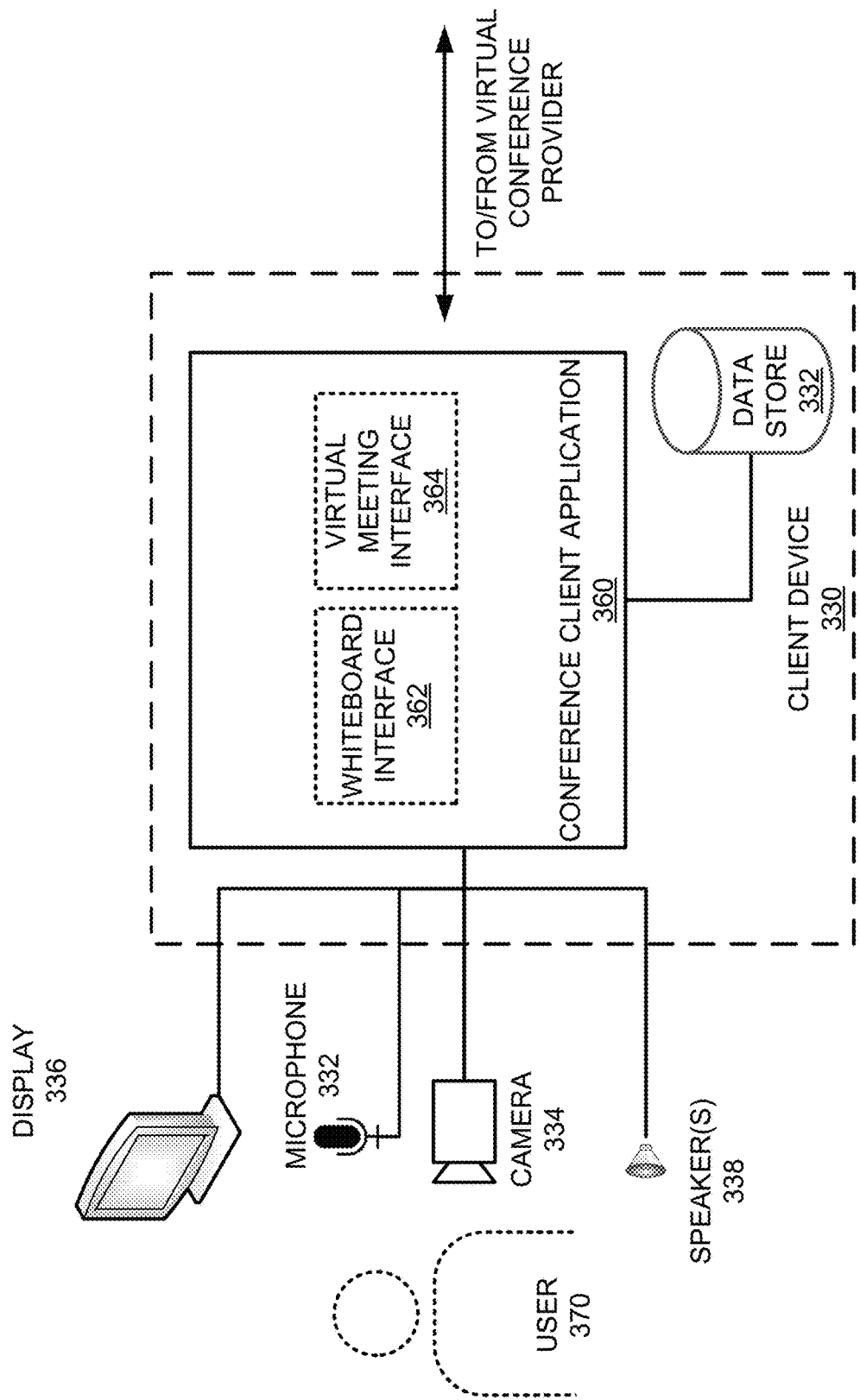

Referring now to FIG. 3B, FIG. 3B shows a client device 330 that executes a virtual conference client application 360 (or "client application"). The client application 360 provides functionality 362 to enable the user 370 to interact with virtual whiteboards, such as to view or edit, and to join and participate in virtual conferences 364, as discussed above with respect to FIGS. 1-3A. In addition, the client application 360 may allow other functionality, such as text chat functionality, conference scheduling, person-to-person voice chats (similar to a conventional telephone call), or any other suitable functionality.

To enable virtual conferencing functionality, the client application 360 interacts with various input and output devices, such as a microphone 332 and camera 334, and display 336 and speaker(s) 338. The client application 360 can control the microphone 332 and camera 334 to capture audio and video streams to send to the virtual conference provider, the display 336 to present a graphical user interface ("GUI") for the user 370 to interact with, which may include video output from received video streams, and the speaker(s) 338 to output received audio streams. In this example, the client application 360 includes a whiteboard interface 362 to enable the user to view and edit virtual whiteboards via a GUI.

Figure 4:
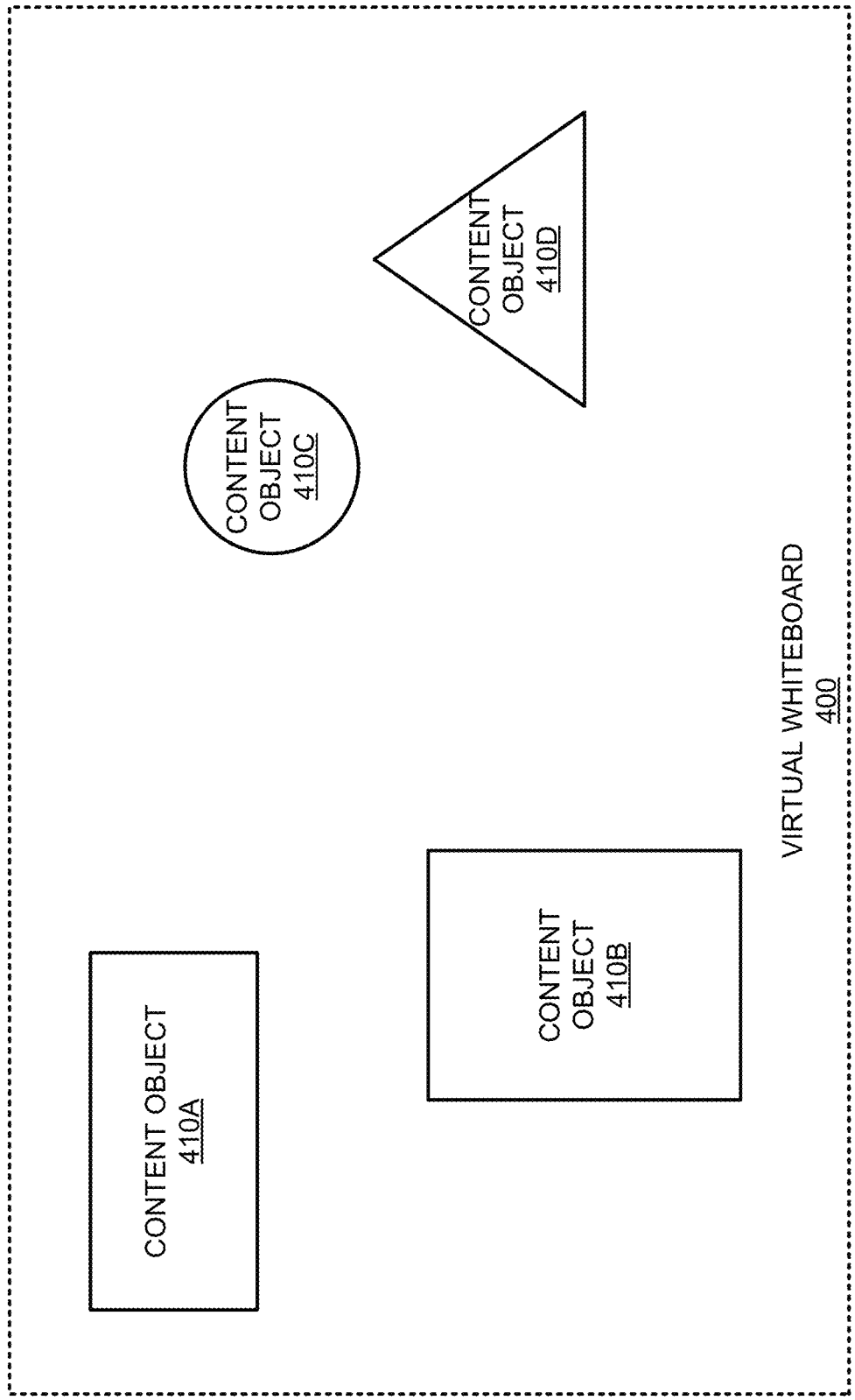
FIGS. 4-5 show an example virtual whiteboard.

Referring now to FIG. 4, FIG. 4 shows an example virtual whiteboard 400. The virtual whiteboard 400 includes four content objects 410a-d that have been inserted into the whiteboard 400 and stored at the virtual conference provider 310. The content objects 410a-d may be any type of content supported by the virtual whiteboard, including graphics, audio, video, or documents. It should be appreciated that while the whiteboard 400 is depicted as having certain boundaries in FIG. 3B, the boundaries are not fixed and may be expanded (or contracted) as needed to allow space to add new content or reduce the size of the whiteboard after removing existing content. But, in general, because the whiteboard's virtual size, e.g., the number of pixels in width or height, may exceed the display area of a user's display, the user may need to navigate within the virtual whiteboard, such as by using input devices like a mouse, trackball, keys on a keyboard, or touchscreen. They may be able to pan to different regions of the virtual whiteboard 400 or zoom in or out of the whiteboard 400.

Figure 5:
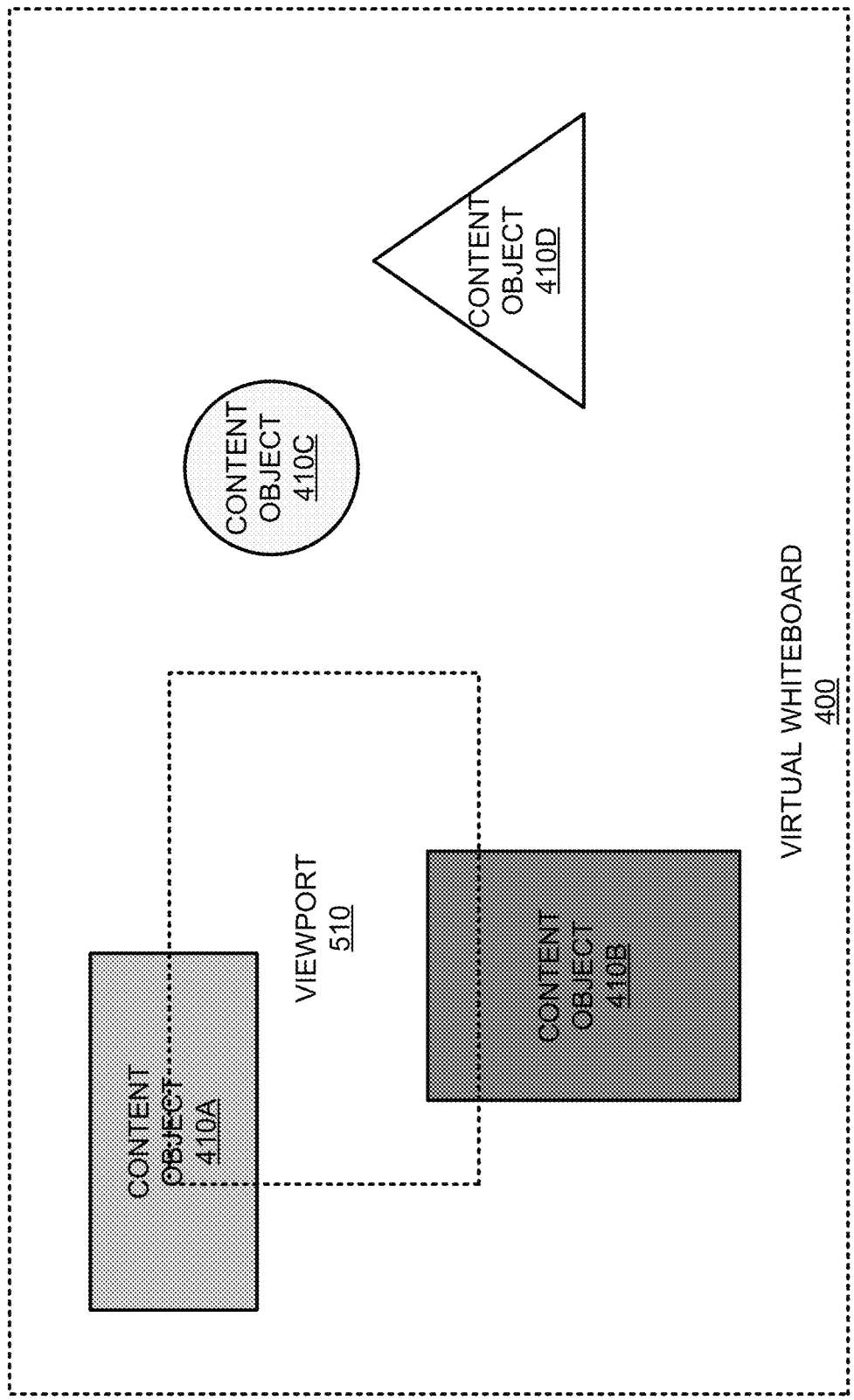

Referring now to FIG. 5, FIG. 5 illustrates how a user's display may access a portion of a virtual whiteboard 400. In this example, the user accesses the virtual whiteboard using a client application that provides a view of a portion of the virtual whiteboard 400. The user's view is represented by viewport 510, which is positioned within the boundaries of the virtual whiteboard 400. Thus, the user is able to see a portion of content objects 410a-b, but not content objects 410c-d. However, the user may navigate within the virtual whiteboard 400 to change the location of the viewport 510 to see different regions.

As discussed above, a user may present their view of a virtual whiteboard 400 during a virtual meeting, as visualized by viewport 510. Thus, if the user attempts to navigate to different regions of the virtual whiteboard 400 during the meeting, the participants will be able to see whatever content that the viewport 510 traverses while the presenter navigates to a desired region, which may recorded when the meeting is recorded, as will be discussed in more detail below.

Figure 6A:
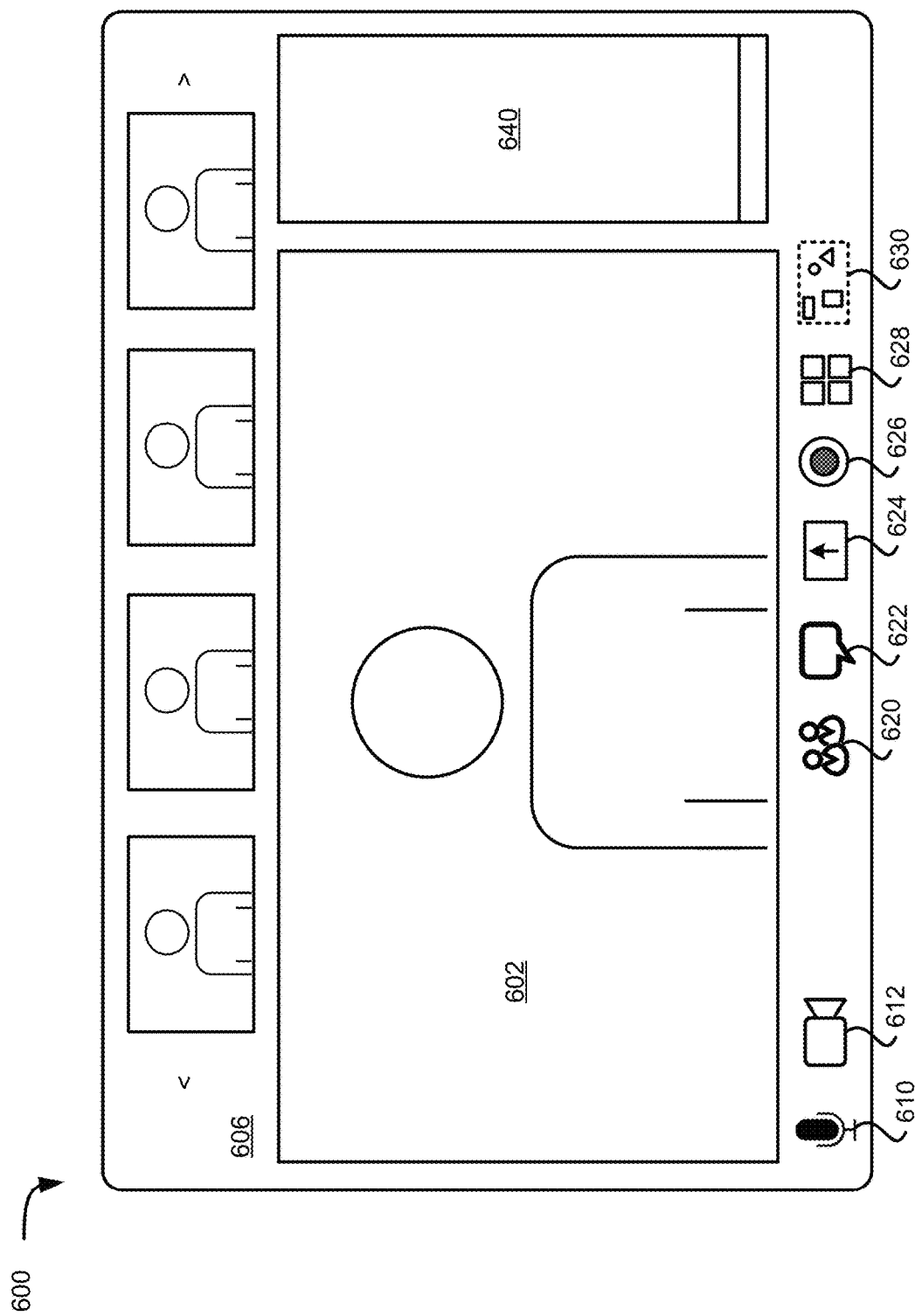
FIGS. 6A-6B show an example graphical user interface for recording virtual whiteboards during virtual meetings.
Figure 6B:
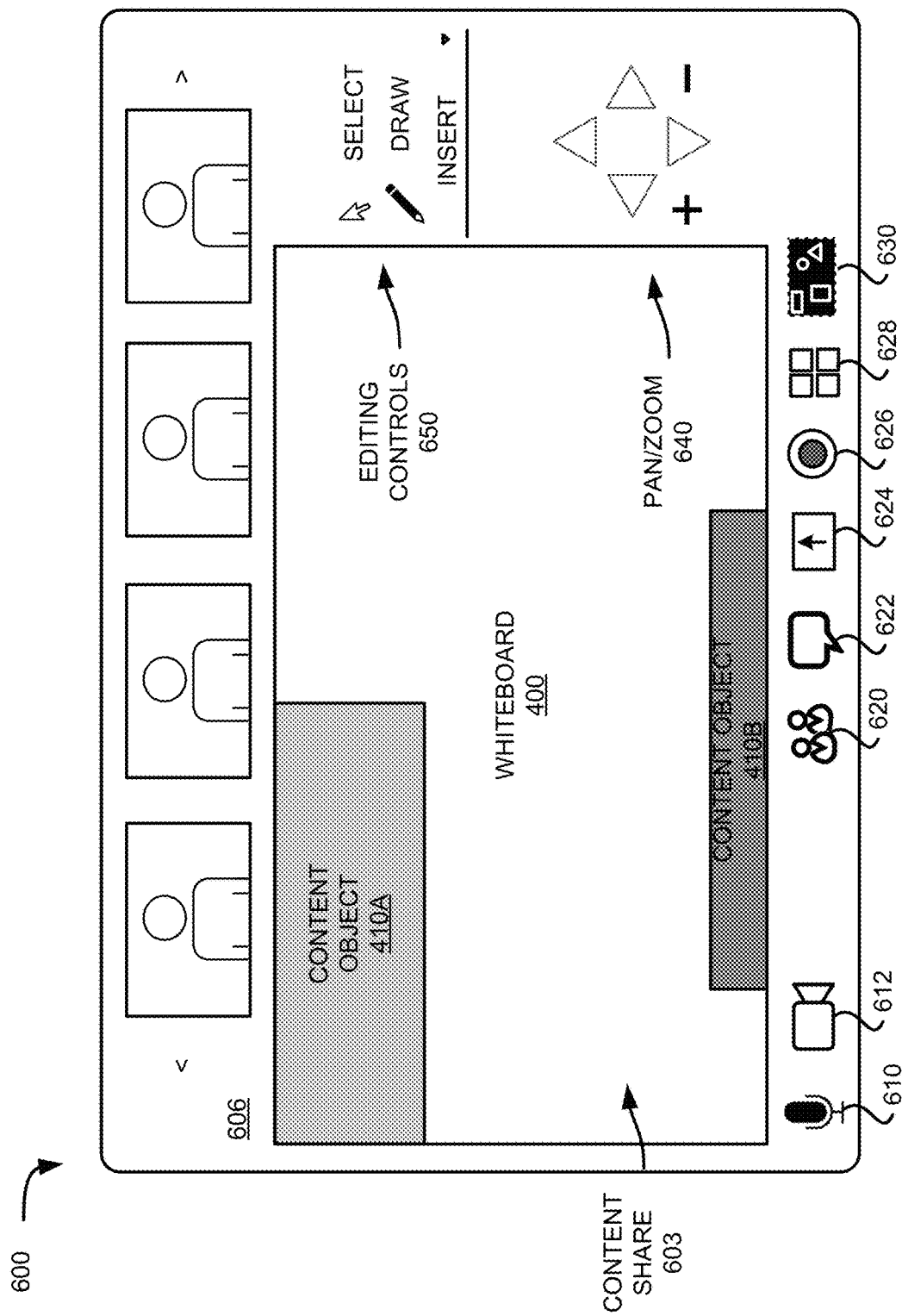

Referring now to FIGS. 6A-6B, FIG. 6A illustrates an example GUI 600 for a client application that can interact with a system for providing real-time translation during virtual conferences. A client device, e.g., client device 330 or client devices 340a-n, executes a client application as discussed above, which in turn displays the GUI 600 on the client device's display. In this example, the GUI 600 includes a speaker view window 602 that presents the current speaker in the virtual conference. Above the speaker view window 602 are smaller participant windows 604, which allow the participant to view some of the other participants in the virtual conference, as well as controls ("<" and ">") to let the host scroll to view other participants in the virtual conference. On the right side of the GUI 600 is a chat window 640 within which the participants may exchange chat messages.

Beneath the speaker view window 602 are a number of interactive elements 610-630 to allow the participant to interact with the virtual conference software. Controls 610-612 may allow the participant to toggle on or off audio or video streams captured by a microphone or camera connected to the client device. Control 620 allows the participant to view any other participants in the virtual conference with the participant, while control 622 allows the participant to send text messages to other participants, whether to specific participants or to the entire meeting. Control 624 allows the participant to share content from their client device. Control 626 allows the participant toggle recording of the meeting, and control 628 allows the user to select an option to join a breakout room. Control 630 allows a user to access a virtual whiteboard. When the whiteboard button 630 is selected, the user may select a whiteboard to access and present during the virtual conference.

Referring now to FIG. 6B illustrates the GUI 600 after a user has selected the whiteboard button 630 and selected a whiteboard to access. After selecting the whiteboard 400, it is presented in a content share window 603 in the GUI 600. The content displayed in the content share window 603 is presented to the user via the GUI 600 and is also provided to the other participants in the virtual meeting. The user may then interact with the whiteboard 400 using navigational inputs, such as via the pan/zoom controls 640 or gestures, or may edit the whiteboard 400 using editing controls 650 to select content in the whiteboard 400, draw new content, or insert content from another source. As the user interacts with the whiteboard 400, the interactions are reflected in the content share window 603 and also provided to the other participants, who can view the whiteboard 400 and interactions within their respective client applications.

To record the virtual meeting, as well as the whiteboard interactions, the user may select GUI control 626, which causes the virtual meeting to be recorded. The virtual meeting may be recorded at the virtual conference provider or locally at the client device 330. In either case, the various video and audio streams exchanged between the participants are recorded as well as the information presented in the content share window 603. In addition, whiteboard information may be recorded as well, such as the state of the whiteboard at the time recording begins as well as subsequent changes to the whiteboard's state during the virtual meeting, such as when content is added, modified, or removed.

Figure 7:
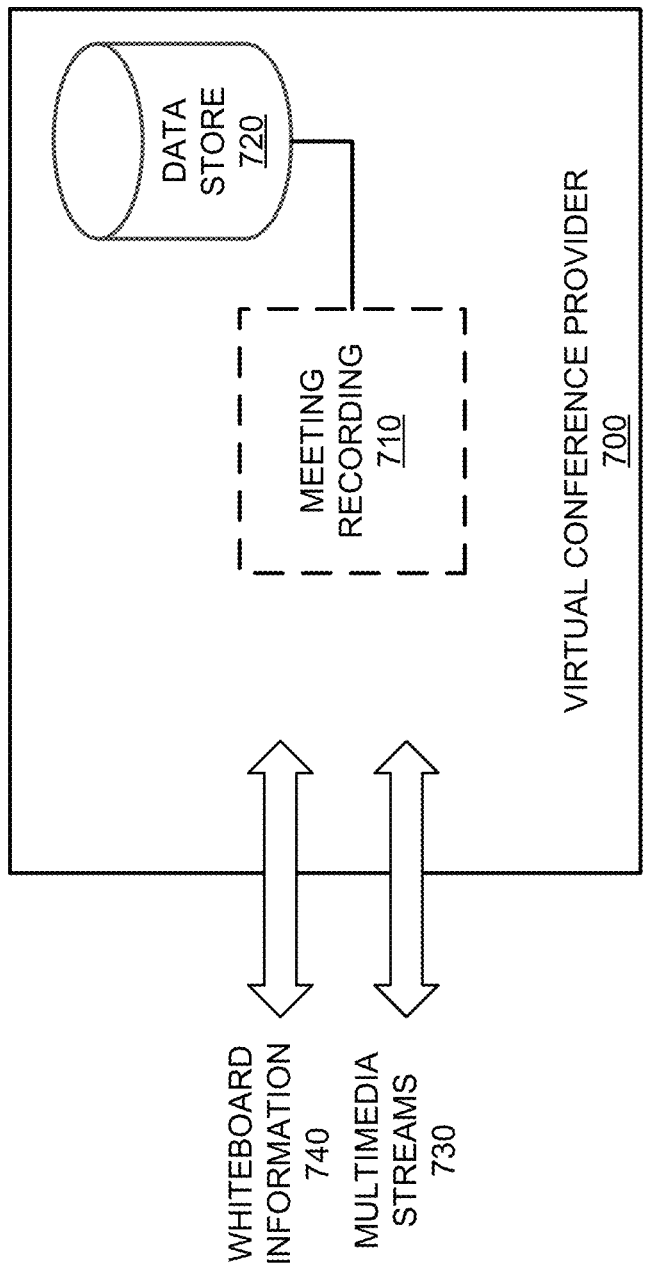
FIG. 7 shows an example virtual conference provider for recording virtual whiteboards during virtual meetings.

Referring now to FIG. 7, FIG. 7 illustrates an example system for recording virtual whiteboards during virtual meetings. In this example, the virtual conference provider 700 hosts a virtual meeting between multiple participants. During the virtual meeting, participants exchange audio or video streams, represented as multimedia streams 730, though it should be appreciated that multimedia streams 730 are not limited to audio and video streams from participants.

In addition, if a participant has selected the option to access a whiteboard during the meeting, whiteboard information may be transmitted to the virtual conference provider 700. The other participants may then see the effect of any changes to the whiteboard based on the changed view of the whiteboard provided to their client applications.

When a user selects the recording control 626 in the GUI 600, the virtual conference provider 700 employs its meeting recording 710 functionality to record the received multimedia streams 730 to a data store 720. In addition, the view of whiteboard 400 presented to the various participants is recorded as another "stream" in the recording. However, the virtual conference provider 700 also records whiteboard information provided by the user accessing the whiteboard 400. The whiteboard information may identify the whiteboard 400 being accessed, such as with a URL or identifier for the whiteboard, a location and size of a viewport 520 into the whiteboard 400, and a level of zoom into the whiteboard. Over time, the whiteboard information associated with the viewport may change as the user interacts with the whiteboard. The whiteboard information may also indicate changes to the virtual whiteboard 400 made during the virtual meeting, such as the additional or removal of content from the whiteboard 400 or modifications to the whiteboard 400. The whiteboard information may include one or more coordinates associated with a location of the changes made and an identification of the content that has been added, removed, or modified. The whiteboard information may then be associated with a timestamp within the recording.

For example, when the whiteboard is initially accessed, a URL to the whiteboard, the initial state of the whiteboard, and viewport information may be stored and associated with a timestamp in the recording. Or if the whiteboard was already being accessed when recording began, the initial timestamp of the recording may have the URL, initial state, and the viewport information associated with it. Then, as the viewport changes, updated whiteboard information 740 may be provided and associated with a timestamp. Similarly, state changes to the whiteboard may be identified and stored with an associated timestamp, such as copies or representations of content items, copies or representations of modified content items, etc. Thus, the recording stored in the data store 720 may include a recording of a multimedia stream providing a graphical view of the whiteboard 400, but also whiteboard information 740 that describes the interactions with the whiteboard and provides information that may be used to reconstruct the state of the whiteboard at a particular timestamp.

It should be appreciated that because changes to the whiteboard 400 may occur only at certain times, the state of the whiteboard 400 may not be saved at every timestamp. Instead, the state of the whiteboard 400 at the beginning of the recording, or when the whiteboard 400 is first accessed, may be stored, followed by storing the changes made, rather than storing the entire state of the whiteboard 400 each time a change is made. Thus the state of the whiteboard 400 at any timestamp in the recording may be reconstructed based on the initial state of the whiteboard 400 as modified by subsequent whiteboard information 740. However, some examples may store the entire state of the whiteboard 400 after each change is made.

While this example is shown from the perspective of the virtual conference provider 700, a client device may record the virtual meeting locally and perform the same functionality locally as the virtual conference provider 700 may provide as discussed above. Thus, the client device may record the multimedia streams 730 exchanged during the virtual conference as well as the whiteboard information 740.

Figure 8A:
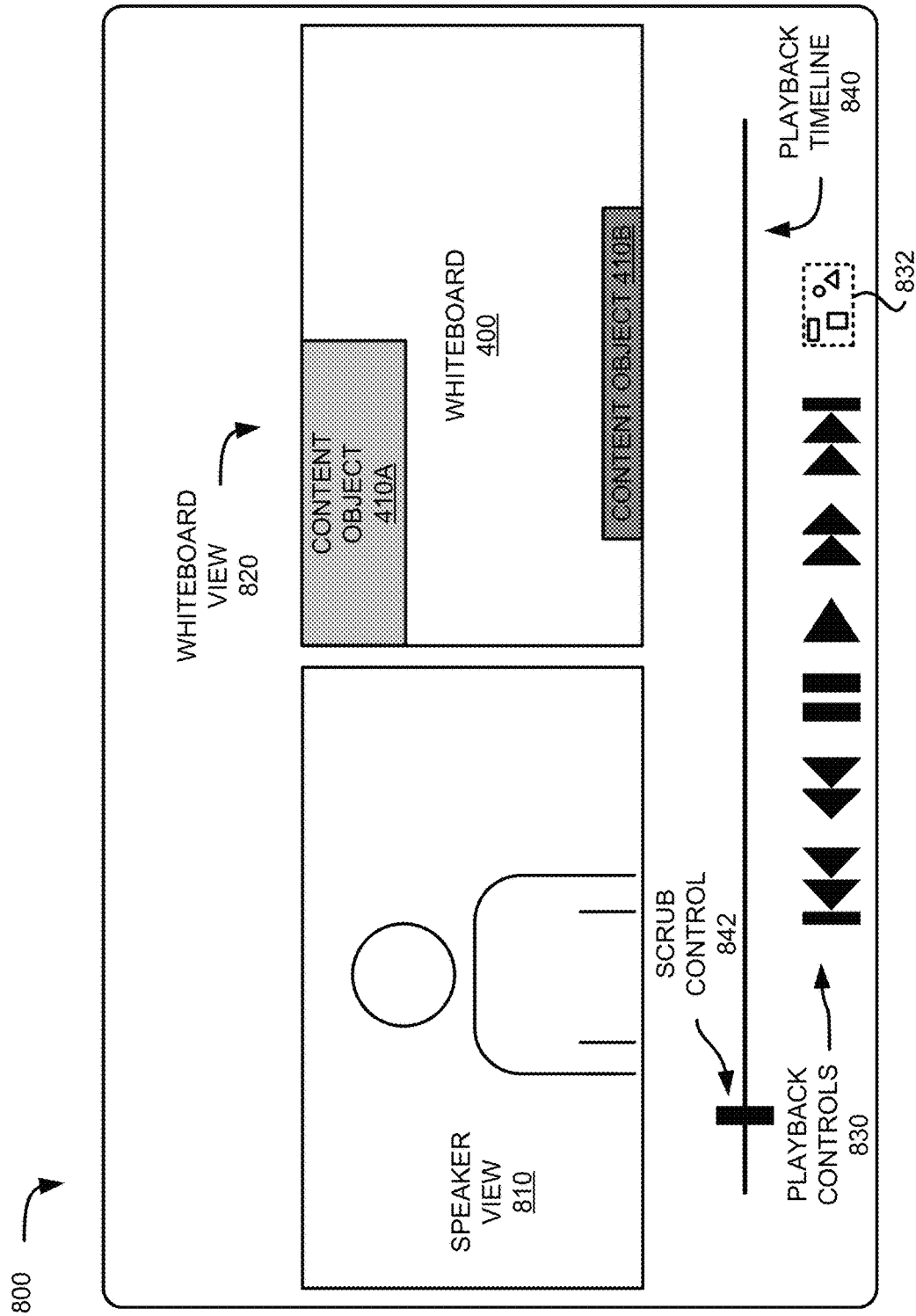
FIGS. 8A-8B show an example graphical user interface for viewing recorded virtual whiteboards during virtual meetings.
Figure 8B:
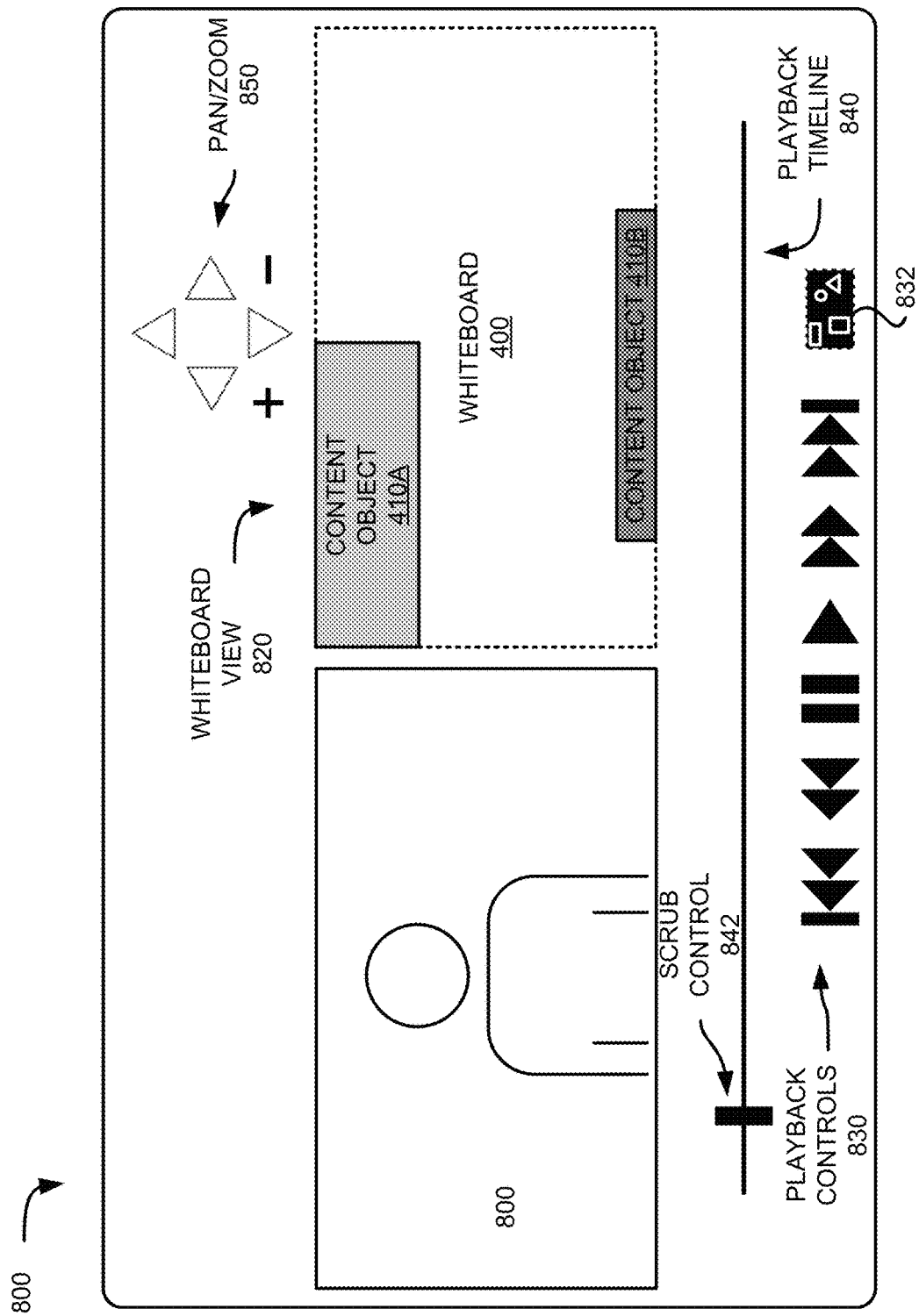

Referring now to FIGS. 8A-8B, FIG. 8A shows an example GUI 800 for recording virtual whiteboards during virtual meetings. The GUI 800 in this example is provided by the client application 360 to allow a user to review a recording of a virtual meeting. The GUI 800 includes a speaker view window 810, similar to the speaker view window 602 shown in FIG. 6. During playback of a meeting recording, the speaker view window 602 can show the then-current speaker during the virtual meeting or it may show content presented during the meeting, such as a presentation or document. In some examples, it may also show a purely non-interactive graphical view of the recorded whiteboard. The GUI 800 also includes various playback controls 830, including play, pause, fast-forward, and rewind controls, a whiteboard control 832, and a playback timeline 840 with a scrub control 842 to allow a user to select and drag the recording to a particular desired time.

In this example, the GUI 800 also includes a whiteboard view 820 that may be presented in recordings that include recorded whiteboard information. The whiteboard view 820 provides a view of a whiteboard, e.g., whiteboard 400, that was recorded during a virtual meeting. During playback of the recording, the user is able to view the audio and video of participants speaking within the speaker view 810, or the non-interactive graphical view of the whiteboard 400. In addition, the whiteboard view 820 shows the view of the whiteboard 400 that the participants had during the virtual meeting. Thus, the GUI 800 shows the whiteboard 400 as it appeared and was manipulated during the virtual meeting.

However, in the whiteboard view 820, a user may select the whiteboard control 832 or the whiteboard 400 within the whiteboard view 820 to enable interactions with the whiteboard 400 in its state at the particular time during the virtual meeting. By interacting with the GUI 800, the user can select the whiteboard view 820 to initiate interactions with the whiteboard 400. Thus, the user may view an interactive view of the whiteboard 400 concurrently with video of meeting participants in the speaker view window or a view of the whiteboard as presented during the meeting. Such an example may allow the user to freely navigate within the whiteboard 400 while also viewing the portion of the whiteboard 400 being discussed during the meeting.

FIG. 8B illustrates the GUI 800 after the user has selected the whiteboard view 820 to interact with the whiteboard 400, changing the appearance of the whiteboard view 820 to indicate it is in an interactive mode rather than a passive viewer mode. In addition, the GUI 800 now displays pan/zoom controls 850 to allow the user to navigate within the virtual whiteboard 400 during the meeting. However, the user may employ other navigational controls, such as gestures, to interact with the virtual whiteboard 400. Thus, after entering the interactive mode, the user can pan around the whiteboard 400 or zoom in or out as desired. Further, they may perform these actions while playback is paused or during playback. During playback, the user may be able to see changes made to the whiteboard 400 in real time while also being able to navigate to other parts of the whiteboard 400 as desired.

As discussed above, whiteboard information recorded during the virtual meeting may establish an initial state of the whiteboard at the beginning of the recording or from when the whiteboard 400 was first shared during the meeting. It may then record additional whiteboard information corresponding to navigational movements during the meeting as well as changes to the whiteboard's content, including the addition, modification, or deletion of content from the whiteboard, which are synchronized with timestamps or frames of the recorded virtual meeting. Thus, playback of the virtual meeting allows the synchronized viewing of the whiteboard's state during the virtual meeting, including viewing the different parts of the whiteboard viewed during the meeting and the changes made to it. If the user elects to stop interacting with the whiteboard, they may interact again with the whiteboard control 832 and return to a synchronized view of the whiteboard according to the whiteboard information.

Figure 9:
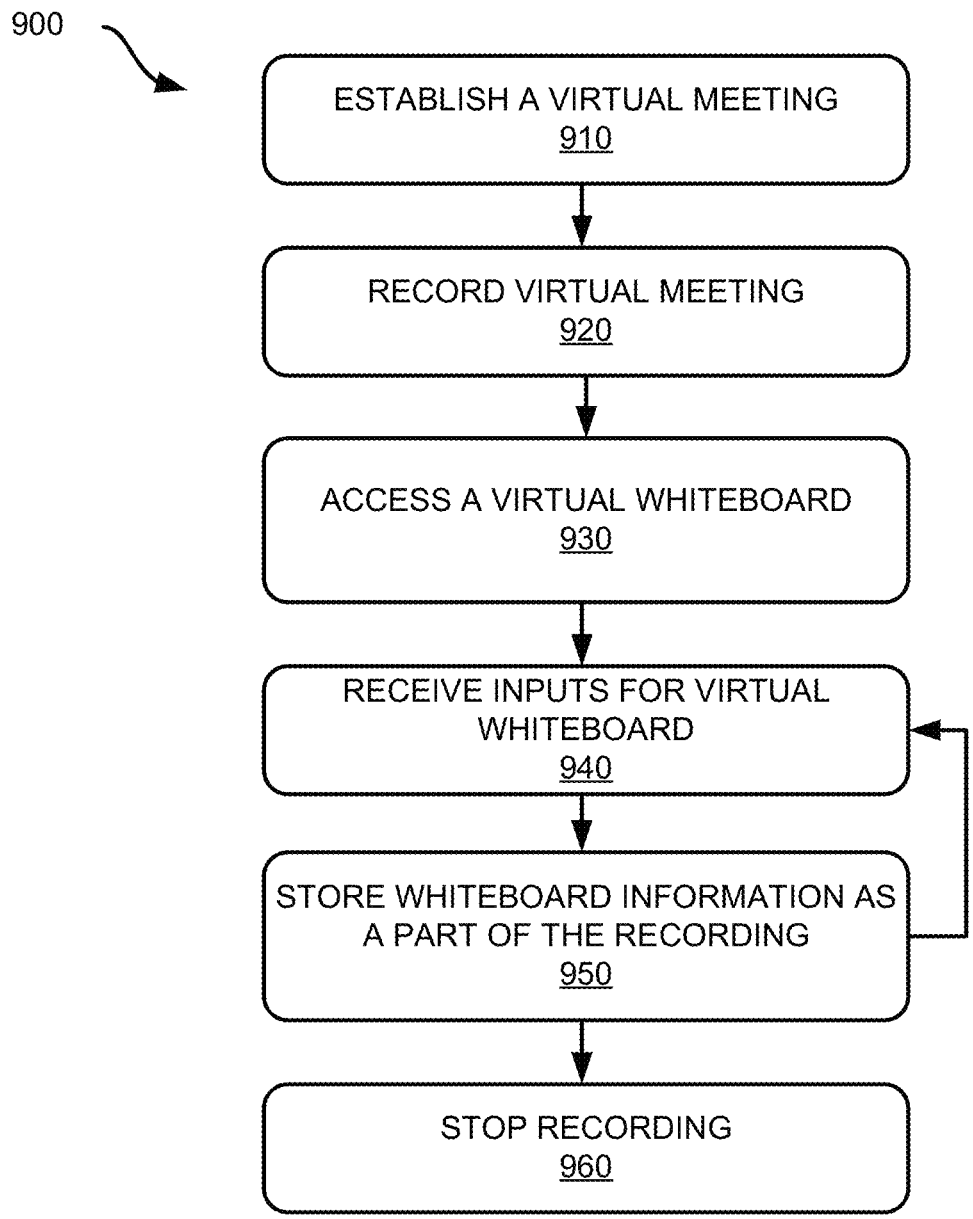
FIGS. 9-10 show example methods for recording virtual whiteboards during virtual meetings.

Referring now to FIG. 9, FIG. 9 shows an example method 900 for recording virtual whiteboards during virtual meetings. This example method 900 will be described with respect to the system 300 shown in FIGS. 3A-3B and the video conference provider 700 shown in FIG. 7; however, any suitable systems according to this disclosure may be employed in various examples. Because recording may be performed by either the video conference provider or by a client device, each of the steps will be described from each computing device's perspective.

At block 910, the virtual conference provider 700 establishes a new virtual meeting, generally as described above with respect to FIGS. 1-2. Alternatively, a client device, e.g., client device 330, may establish a new virtual meeting by transmitting a request to start a virtual meeting to a virtual conference provider 700, generally as described above with respect to FIGS. 1-2.

At block 920, the virtual conference provider 700 begins recording the virtual meeting in response to a request to record the virtual meeting. In some examples, the virtual conference provider 700 may be configured to automatically record a virtual meeting, such as based on a configuration parameter for the meeting. In this example, the virtual conference provider 700 records the virtual meeting to its data store 720. To record the virtual meeting, the virtual conference provider 700 may receive audio and video streams from the participants in the virtual meeting and store the received audio and video streams to one or more data files. In addition, the virtual conference provider 700 may store timestamp information associated with recorded video or audio streams. Alternatively, the client device 330 may begin recording the virtual meeting in response to a request to record the virtual meeting, such as to a data store 332, generally in the same manner as the virtual conference provider.

At block 930, the virtual conference provider 700 accesses a virtual whiteboard 400, such as based on a request received from a client device. For example, the virtual conference provider 700 may receive a request via URL or may receive an identification of a virtual whiteboard 400 to access. The virtual conference provider 700 then accesses the corresponding whiteboard 400 and provides access to the requesting client device.

Alternatively, a client device 330 may receive a request to access a virtual whiteboard 400 from a user request via a GUI 600, such as based on a selection of a virtual whiteboard control 630. The user may then identify the whiteboard 400, such as by selecting the virtual whiteboard 400 from a list of available virtual whiteboards, by providing an identifier of a virtual whiteboard 400, or by providing a URL for the virtual whiteboard 400. The client device 330 may then access the virtual whiteboard based on the provided information.

At block 940, the virtual conference provider 700 receives inputs for the virtual whiteboard 400. As discussed above, a user may navigate within the virtual whiteboard 400 or may add, modify, or remove content from the virtual whiteboard 400. The inputs may be provided to the virtual conference provider 700 to provide a new portion of the virtual whiteboard or to effect the changes to the content in the virtual whiteboard, such as by identifying a content object to modify or delete, or new content to add to the virtual whiteboard 400 as a content object.

Alternatively, the client device 330 may receive inputs via a GUI 600 to navigate within the virtual whiteboard 400 or to modify the state of the virtual whiteboard 400, such as by adding content, modifying content, or removing content from the virtual whiteboard 400, generally as described above with respect to FIG. 6B.

At block 950, the virtual conference provider 700 stores whiteboard information associated with the inputs as a part of recording the virtual meeting. For example, the virtual conference provider 700 may store the location of a viewport 510 within the virtual whiteboard 400, the size of the viewport 510, or the zoom level of the viewport 510. The virtual conference provider 700 may also store information associated with content within the virtual whiteboard, such as the location and identification of one or more content objects and whether the content object was added, modified, or removed. The virtual conference provider 700 may store whiteboard information associated with each individual input, or it may only store whiteboard information associated with certain inputs.

For example, if the user navigates to a new location within the virtual whiteboard, the virtual conference provider may store location information for the viewport 510 at each incremental movement to the destination, or it may only store location information for the destination. In addition, the whiteboard information may be associated with a timestamp or a frame number corresponding to audio or video stored in the recording. Such functionality may enable whiteboard information to be synchronized with audio or video streams within the recording. Alternatively, the client device 330 may store such whiteboard information generally as the video conference provider 700 does.

After storing the whiteboard information, the method 900 returns to block 940 where additional inputs to the whiteboard 400 may be received.

At block 960, the virtual conference provider 700 receives a request to stop recording the virtual meeting. For example, the client device 330 may transmit a request to stop recording or the virtual meeting may terminate, which stops the recording.

Figure 10:
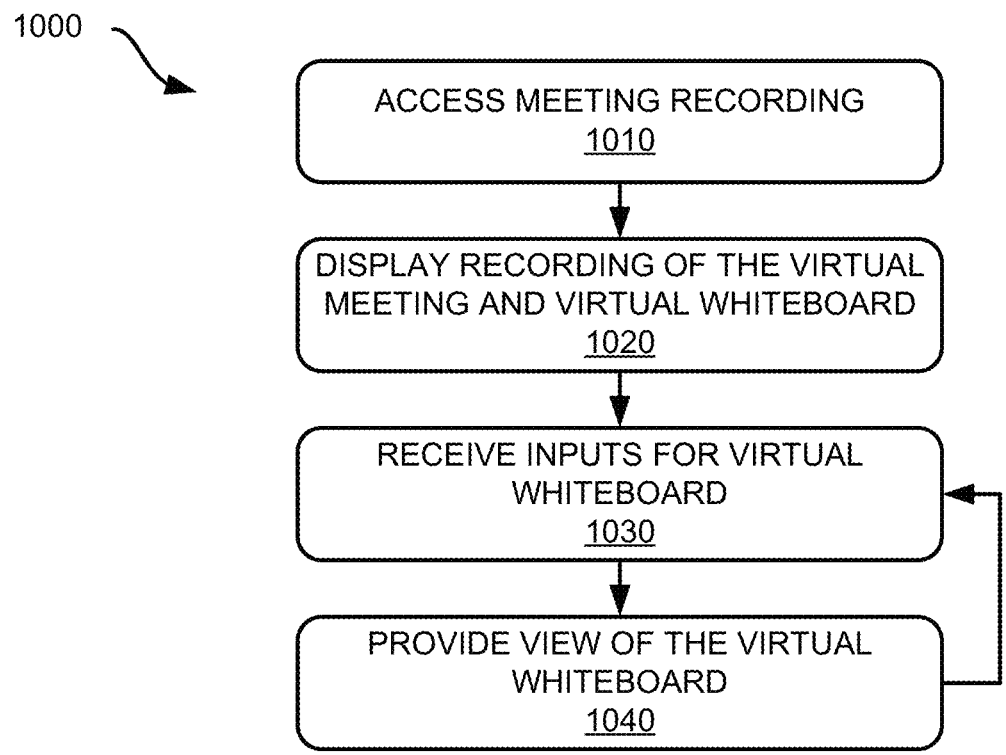

Referring now to FIG. 10, FIG. 10 shows another example method 1000 for recording virtual whiteboards during virtual meetings. This example will be described with respect to the system 300 shown in FIG. 3A and the GUIs shown in FIGS. 8A-8B; however, any suitable systems according to this disclosure may be employed in various examples.

At block 1061, the client device 330 accesses the recording of the virtual meeting. For example, the user may access the recording using the client application 360 and the GUI 800 shown in FIGS. 8A-8B.

At block 1020, the client device 330 displays the recording of the virtual meeting and virtual whiteboard 400, such as by using the GUI 800 shown in FIGS. 8A-8B.

At block 1030, the client device 330 receives inputs associated with the virtual whiteboard 400. As discussed above with respect to FIGS. 8A-8B, a user may select a GUI control 832 to interact with the virtual whiteboard within the recording. The user may then provide navigational inputs to interact with the virtual whiteboard 400, such as by interacting with pan/zoom controls 850 or by employing gestures to navigate within the virtual whiteboard 400.

At block 1040, the client device 330 provides a view of the virtual whiteboard. In this example, the client application 360 accesses the recording and the whiteboard information stored in the recording to generate a view of the virtual whiteboard. For example, the state of the whiteboard at the beginning of the recording, as well as an initial viewport 510 location, may be used to provide a view of the virtual whiteboard. Subsequently recorded whiteboard information may be used to modify the state of the whiteboard, e.g., the whiteboard information may describe changes to the whiteboard. Thus, the changes may be applied to the state of the whiteboard to add, remove, or modify content in the whiteboard. Similarly, the whiteboard information may identify changes to the viewport 510 or zoom level, changing the view of the whiteboard.

If a user inputs navigational inputs, such as at block 1030, the client application 360 or the virtual conference provider 700 may generate an updated view of the whiteboard based on the initial state of the whiteboard as well as an intervening changes to the whiteboard as reflected in the whiteboard information. Thus, the user can navigate freely within the whiteboard 400 while viewing the recording. As discussed above with respect to FIGS. 8A-8B, the user may navigate within the whiteboard 400 while the recording is paused or while audio or video is being output. This allows the user to view the whiteboard from any location during the virtual meeting to observe whiteboard content of interest, such as while listening to discussions between meeting participants about content in the whiteboard. It should be appreciated that blocks 1030 and 1040 may repeat iteratively as the user navigates within the virtual whiteboard 400.

Figure 11:
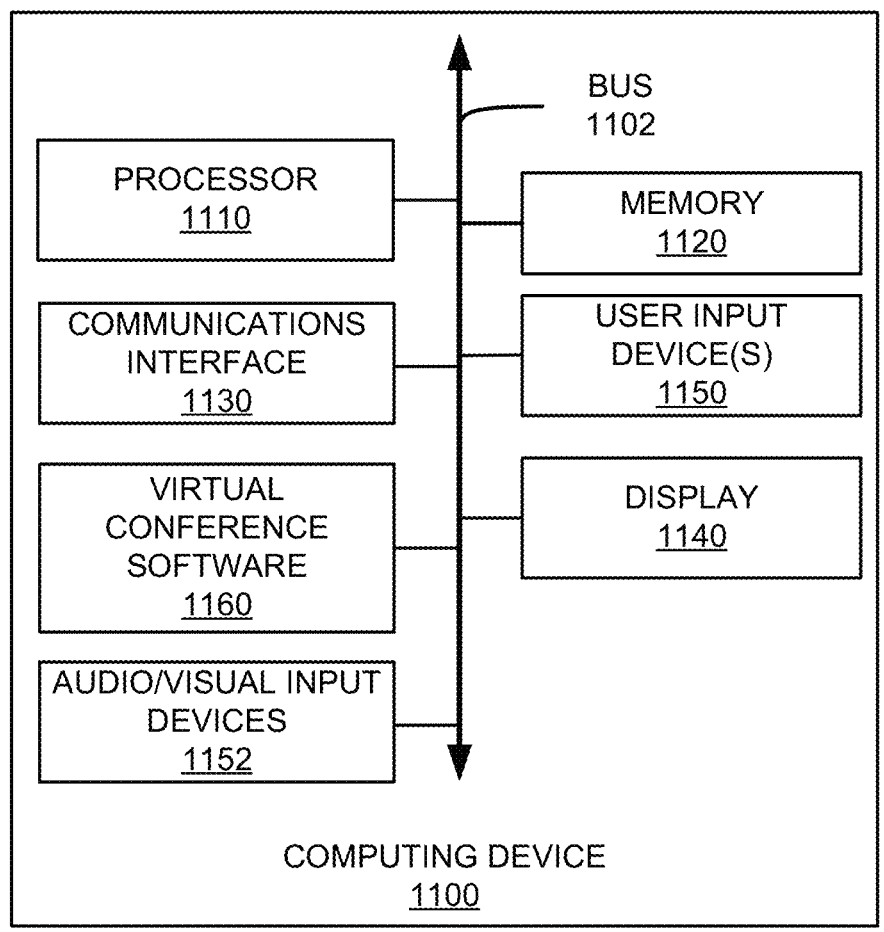
FIG. 11 shows an example computing device suitable for systems and methods for recording virtual whiteboards during virtual meetings.

Referring now to FIG. 11, FIG. 11 shows an example computing device 1100 suitable for use in example systems or methods for recording virtual whiteboards during virtual meetings according to this disclosure. The example computing device 1100 includes a processor 1110 which is in communication with the memory 1120 and other components of the computing device 1100 using one or more communications buses 1102. The processor 1110 is configured to execute processor-executable instructions stored in the memory 1120 to perform one or more methods for recording virtual whiteboards during virtual meetings according to different examples, such as part or all of the example methods 900-1000 described above with respect to FIGS. 9-10. The computing device, in this example, also includes one or more user input devices 1150, such as a keyboard, mouse, touchscreen, microphone, etc., to accept user input. The computing device may also include one or more audio or visual input devices, such as a camera and a microphone, or one or more ports to receive audio or video feeds from an external device, such as a camera, video player, etc. The computing device 1100 also includes a display 1140 to provide visual output to a user.

In addition, the computing device 1100 also includes both video conference software 1160 and presentation content software 1170. A user of the computing device 1100 may use the video conference software 1160 to join and participate in a video conference, generally as discussed above, and to interact with virtual whiteboards.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
    establishing a virtual meeting and joining a plurality of client devices to the virtual meeting, each client device associated with a corresponding participant;
    in response to a request to record the virtual meeting, recording the virtual meeting;
    accessing, during the virtual meeting, a virtual whiteboard based on a request received from a first participant;
    receiving, during the virtual meeting, inputs associated with the virtual whiteboard from the first participant;
    recording, during the virtual meeting, whiteboard information comprising successive state information of the virtual whiteboard only when changes are made to the virtual whiteboard based on the inputs; and
    storing the whiteboard information a part of recording the virtual meeting.

2. The method of claim 1, wherein the inputs comprise navigational inputs or content editing inputs associated with the virtual whiteboard.

3. The method of claim 1, wherein the whiteboard information comprises one or more links to the virtual whiteboard, the one or more links identifying regions within the virtual whiteboard.

4. The method of claim 1, wherein the successive state information comprises viewport information associated with views of the virtual whiteboard corresponding to the successive state information during the virtual meeting.

5. The method of claim 1, wherein the whiteboard information is associated with one or more timestamps in the recording of the virtual meeting.

6. The method of claim 1, further comprising:
    receiving a request from a first client device to review the recording of the virtual meeting;
    streaming the recording to the first client device; and
    providing the whiteboard information to the first client device.

7. The method of claim 6, wherein the whiteboard information is synchronized to the recording of the virtual meeting.

8. The method of claim 6, further comprising:
    receiving a request to access the virtual whiteboard from the first client device, the request associated with the whiteboard information from the recording; and
    providing a portion of the virtual whiteboard to the first client device based on the request to access the virtual whiteboard.

9. A system comprising:
    a non-transitory computer-readable medium;
    a communications interface; and
    one or more processors communicatively coupled to the non-transitory computer-readable medium and the communications interface, the one or more processors configured to execute processor-executable instructions stored in the non-transitory computer-readable medium to:
        establish a virtual meeting and joining a plurality of client devices to the virtual meeting, each client device associated with a corresponding participant;
        in response to a request to record the virtual meeting, record the virtual meeting;
        access a virtual whiteboard based on a request received from a first participant;
        receive inputs associated with the virtual whiteboard from the first participant;
        record, during the virtual meeting, whiteboard information comprising successive state information of the virtual whiteboard only when changes are made to the virtual whiteboard based on the inputs; and
        store the whiteboard information as a part of recording the virtual meeting.

10. The system of claim 9, wherein the inputs comprise navigational inputs or content editing inputs associated with the virtual whiteboard.

11. The system of claim 9, wherein the whiteboard information comprises one or more links to the virtual whiteboard, the one or more links identifying regions within the virtual whiteboard.

12. The system of claim 9, wherein the successive state information comprises viewport information associated with views of the virtual whiteboard corresponding to the successive state information during the virtual meeting.

13. The system of claim 9, wherein the whiteboard information is associated with one or more timestamps in the recording of the virtual meeting.

14. The system of claim 9, wherein the one or more processors are configured to execute further processor-executable instructions stored in the non-transitory computer-readable medium to:
    receive a request from a first client device to review the recording of the virtual meeting;
    stream the recording to the first client device; and
    provide the whiteboard information to the first client device.

15. The system of claim 14, wherein the whiteboard information is synchronized to the recording of the virtual meeting.

16. A non-transitory computer-readable medium comprising processor-executable instructions configured to cause a processor to:
    establish a virtual meeting and joining a plurality of client devices to the virtual meeting, each client device associated with a corresponding participant;
    in response to a request to record the virtual meeting, record the virtual meeting;
    access, during the virtual meeting, a virtual whiteboard based on a request received from a first participant;
    receive, during the virtual meeting, inputs associated with the virtual whiteboard from the first participant;
    record, during the virtual meeting, whiteboard information comprising successive state information of the virtual whiteboard only when changes are made to the virtual whiteboard based on the inputs; and
    store the whiteboard information as a part of recording the virtual meeting.

17. The non-transitory computer-readable medium of claim 16, wherein the inputs comprise navigational inputs or content editing inputs associated with the virtual whiteboard.

18. The non-transitory computer-readable medium of claim 16, wherein the whiteboard information comprises one or more links to the virtual whiteboard, the one or more links identifying regions within the virtual whiteboard.

19. The non-transitory computer-readable medium of claim 16, wherein the successive state information comprises viewport information associated with views of the virtual whiteboard corresponding to the successive state information during the virtual meeting.

20. The non-transitory computer-readable medium of claim 16, wherein the whiteboard information is associated with one or more timestamps in the recording of the virtual meeting.

* * * * *